(12) United States Patent
Hanawa et al.

(10) Patent No.: US 9,236,588 B2
(45) Date of Patent: Jan. 12, 2016

(54) BATTERY PACK AND POWER TOOL PROVIDED WITH THE SAME

(71) Applicant: HITACHI KOKI CO., LTD., Tokyo (JP)

(72) Inventors: Hiroyuki Hanawa, Hitachinaka (JP); Haruhisa Fujisawa, Hitachinaka (JP); Keita Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 14/549,888

(22) Filed: Nov. 21, 2014

(65) Prior Publication Data

US 2015/0075831 A1     Mar. 19, 2015

Related U.S. Application Data

(63) Continuation of application No. 12/740,302, filed as application No. PCT/JP2008/070150 on Oct. 29, 2008, now Pat. No. 8,895,182.

(30) Foreign Application Priority Data

Oct. 29, 2007 (JP) .................................. 2007-280279

(51) Int. Cl.
*H01M 2/08*     (2006.01)
*H01M 2/10*     (2006.01)
(Continued)

(52) U.S. Cl.
CPC .......... *H01M 2/1055* (2013.01); *H01M 2/1066* (2013.01); *H01M 2/30* (2013.01); *H01M 10/4257* (2013.01); *H01M 2220/30* (2013.01); *Y02E 60/12* (2013.01)

(58) Field of Classification Search
CPC ... H01M 2/1055; H01M 2/30; H01M 2/1066; Y02E 60/12
USPC ........................................... 429/178; 173/217
See application file for complete search history.

(56) References Cited

U.S. PATENT DOCUMENTS 6,329,788 B1    12/2001 Baily et al.
6,428,925 B1     8/2002 Takeno et al.
(Continued)

FOREIGN PATENT DOCUMENTS

DE    93 11 901 U1    12/1993
EP    1 035 599 A1     9/2000
(Continued)

OTHER PUBLICATIONS

Japan Patent Office office action for application JP2012-279487 (Mar. 18, 2014).
(Continued)

*Primary Examiner* — Gary Harris
(74) *Attorney, Agent, or Firm* — Kilpatrick Townsend & Stockton LLP

(57) ABSTRACT

A battery pack includes a case having an upper case part and a lower case part. The battery pack further includes a battery cell accommodated inside the case, and a plurality of electrode terminals electrically connected to the battery cell. The upper case part has an opening which is arranged at a position corresponding to a position of the plurality of electrode terminals and exposes the plurality of electrode terminals. The batter pack additionally includes a suppressing member that suppresses foreign matter from entering inside the case via the opening.

5 Claims, 5 Drawing Sheets

(51) Int. Cl.
*H01M 2/30* (2006.01)
*H01M 10/42* (2006.01)

(56) References Cited

U.S. PATENT DOCUMENTS

| | | | |
|---|---|---|---|
| 6,566,005 | B1 | 5/2003 | Shimma et al. |
| 2002/0034895 | A1 | 3/2002 | Morita |
| 2006/0087283 | A1* | 4/2006 | Phillips et al. ............... 320/114 |
| 2006/0222930 | A1 | 10/2006 | Aradachi et al. |
| 2009/0011325 | A1 | 1/2009 | Agehara et al. |
| 2009/0270140 | A1 | 10/2009 | Takahashi |
| 2011/0005793 | A1 | 1/2011 | Hanawa et al. |

FOREIGN PATENT DOCUMENTS

| | | |
|---|---|---|
| EP | 1309019 A2 | 5/2003 |
| EP | 1 696 498 A1 | 8/2006 |
| JP | 10-069893 A | 3/1998 |
| JP | 2000-061868 A | 2/2000 |
| JP | 2001-135290 A | 5/2001 |
| JP | 2001-143678 A | 5/2001 |
| JP | 2001-143768 A | 5/2001 |
| JP | 2003-036915 A | 2/2003 |
| JP | 2005-116224 A | 4/2005 |
| JP | 2005-150079 A | 6/2005 |
| JP | 2006-302759 A | 11/2006 |
| JP | 2007-188717 A | 7/2007 |
| JP | 2008-066141 A | 3/2008 |
| WO | WO2007/037405 A | 4/2007 |

OTHER PUBLICATIONS

Japan Patent Office office action for patent application 2007-280279 (Oct. 26, 2012).
China Intellectual Property Office office action for patent application CN200880113607.3 (Aug. 9, 2013).
Russia Federal Service for Intellectual Property office action for application RU2010115570 (Nov. 15, 2012).
Australia IP Examiner's Report for patent application 2008319717 (Jul. 18, 2011).

\* cited by examiner

BATTERY PACK AND POWER TOOL PROVIDED WITH THE SAME

CROSS REFERENCE TO RELATED APPLICATIONS

This application is a continuation application of U.S. patent application Ser. No. 12/740,302 filed Apr. 28, 2011 which is a National Stage Entry of PCT/JP2008/070150 filed Oct. 29, 2008, and claims priority to Japanese Patent Application No. 2007-280279 filed Oct. 29, 2007. The contents of these applications are incorporated herein by reference.

TECHNICAL FIELD

An aspect of the present invention relates to a battery pack in which an electrode terminal is surely protected, and a power tool provided with the battery pack.

BACKGROUND ART

For example, JP-2006-302759-A discloses a battery pack used in a power tool. In the battery pack, a battery case is L-shaped in a side view, and an electrode terminal to be connected to an electrode terminal of a power tool body is disposed at an upper end of the battery case.

In the battery pack, when the battery pack detached from the power tool is placed in a sideways failing-down state, in case that the shock is applied to the battery pack, if a portion that has received its shock is in the vicinity of the electrode terminal, the shock is readily given onto the electrode terminal, with the result that the electrode terminal can be damaged or broken.

DISCLOSURE OF INVENTION

An object of the present invention is to provide a battery pack in which an electrode terminal is surely protected, and a power tool provided with the same.

According to a first aspect of the present invention, there is provided a battery pack to be inserted and attached to a power tool, including: a case; a battery cell accommodated inside the case; and an electrode terminal connected to the battery cell and provided on the case so as to be connectable to a tool-side electrode terminal, wherein the case includes: a case main portion; and a case sub portion which is protruded from the case main portion to be inserted into the power tool, and wherein the electrode terminal is provided on an upper surface of the case main portion at a side of the case sub portion.

According to a second aspect of the present invention, there is provided the battery pack, wherein the electrode terminal is located more on a side of the case main portion than an imaginary line connecting a protrusion end of the case sub portion and an upper surface end of the case main portion located so as to interpose the electrode terminal with the case sub portion.

According to a third aspect of the present invention, there is provided the battery pack, wherein the electrode terminal is located on an proximal end side of the case sub portion.

According to a fourth aspect of the present invention, there is provided the battery pack, wherein a circuit board mounted with the electrode terminal is accommodated in the case in a posture orthogonal to a connection direction of the electrode terminal and the tool-side electrode terminal.

According to a fifth aspect of the present invention, there is provided the battery pack, wherein electrode terminal includes a plurality of electrode terminals, and wherein partition walls are formed in the case main portion to isolate the electrode terminals from each other.

According to a sixth aspect of the present invention, there is provided the battery pack, wherein electrode terminal includes a plurality of electrode terminals, and wherein the electrode terminals includes: a first electrode terminal group in which plural electrode terminals are arranged in a direction orthogonal to a direction from the case sub portion toward the upper surface end of the case main portion; and a second electrode terminal group in which plural electrode terminals are arranged.

According to a seventh aspect of the present invention, there is provided the battery pack, wherein a direction of each terminal in the first electrode terminal group is orthogonal to a direction of each terminal in the second electrode terminal group.

According to an eighth aspect of the present invention, there is provided the battery pack, wherein a sealing member is provided between the partition walls and the circuit board to seal a space between the partition walls.

According to a ninth aspect of the present invention, there is provided the battery pack, wherein the circuit board is supported by the battery cell.

According to a tenth aspect of the present invention, there is provided the battery pack, wherein a protrusion part which protrudes in the protruding direction of the case sub portion and in a direction crossing the protruding direction is formed in the case.

According to an eleventh aspect of the present invention, there is provided the battery pack, wherein a cushion member is provided between the battery cell and the case.

According to a twelfth aspect of the present invention, there is provided the battery pack, wherein a lock piece to be locked to a lock reception part provided on the power tool when the case sub portion, is fully inserted into the power tool is formed, and wherein a deformation regulating member that regulates a deformation amount of the lock piece is formed.

According to a thirteenth aspect of the present invention, there is provided a power tool to which the battery pack is detachably attached, including: a main body which accommodates a motor that is a drive source therein; a handle portion which extends from the main body; an accommodation part in the handle portion into which the case sub portion is inserted from a leading end of the handle portion; and the tool-side electrode terminal which is formed at the leading end of the handle portion, connected to the motor through an electric wire laid along the handle portion from the main body, and connected to the electrode terminal of the battery pack when the case sub portion has been accommodated into the accommodation part.

According to a fourteenth aspect of the present invention, there is provided the power tool, wherein an intrusion regulating member that regulates an intrusion of the electric wire into the accommodation part is formed in the handle portion.

According to the first aspect, even if the shock is applied from the outside to the battery pack placed in a sideways falling-down state, it is possible to restrain its shock from being applied directly to the electrode terminal, so that the breakage/damage of the electrode terminal can be effectively suppressed. Further, according to the second aspect, since the electrode terminal is located inside the imaginary line, even if the battery pack falls down, its shock is absorbed by the case main portion or the case sub portion. Therefore, the shock is difficult to transmit directly onto the electrode terminal, so that the breakage/damage of the electrode terminal can be more effectively suppressed. Further, as in the third aspect, by locating the electrode terminal on the proximal end side of the case sub portion, the electrode terminal is interposed between the case main portion and the case sub portion, so that it is possible to restrain extremely the shock from being directly applied to the electrode terminal.

According to the fourth aspect, it is possible to prevent the occurrence of release force of the electrode terminal in the mounting portion, produced in the process of connecting the external electrode terminal to the electrode terminal, and the mounting state of the electrode terminal can be maintained stably.

According to the fifth aspect, it is possible to prevent the adjacent electrode terminals from coming into contact with each other in the process of connecting the external electrode terminals and the electrode terminals, or prevent the adjacent electrode terminals from coming into contact with each other by vibration.

According to the sixth aspect, since the plural electrode terminals are arranged as the two electrode terminal groups which are parallel to each other, the lateral width size orthogonal to the upper surface end portion direction of the case main portion can be reduced, compared with the case where all of the electrode terminals are arranged in parallel. Further, as in the seventh aspect, by making the direction of the terminal in the first electrode terminal group orthogonal to the direction of the terminal in the second electrode terminal group, its size of the case main portion 21 can be reduced more.

According to the eighth aspect, since the gap between the partition walls and the circuit board is filled with the sealing member and the space surrounded by the partition walls and the battery pack inside are isolated, powder dusts and water which have intruded into the partition walls do not enter into the battery pack, so that water proofing property and dust proofing property can be secured.

According to the ninth aspect, it is possible to prevent deformation of the circuit board due to stress onto the circuit board produced in the process of connecting the external electrode terminal to the electrode terminal.

In the tenth aspect, according to the kind of cell included in the battery pack, the forming position of the protrusion part is different. Accordingly, regarding plural kinds of battery packs which are different in nominal voltage, in a battery pack which is low in nominal voltage, the forming position of the protrusion part is arranged on the proximal end side of the case sub portion. On the other hand, in a battery pack which is high in nominal voltage, the forming position thereof is arranged on the leading end side of the case sub portion. Further, on the electric device side to which the battery pack is attached, there is formed a stopper which can abut on the protrusion part formed in the battery pack for the maximum voltage usable in the electric device.

Hereby, it is possible to attach the battery pack within the range of the usable voltage to the electric device, and it is possible to prevent the battery pack over the usable voltage from being attached. Accordingly, it is possible to prevent the battery pack unsuitable for the electric device from being attached.

According to the eleventh aspect, since the shock applied from the outside is alleviated by the cushion member, the case inside can be protected. Further, the stress onto the circuit board produced in the connecting time between the electrode terminal and the external electrode terminal can be also alleviated.

According to the twelfth aspect, while permitting the lock piece to deform within the necessary range, the excessive deformation amount is prevented, thereby protecting the lock piece from the breakage and damage.

According to the thirteenth aspect, the power tool is suitable as the power tool using the battery pack. Further, by constituting the power tool as in the fourteenth aspect, the intrusion of the electric wire into the accommodation part can be avoided. Therefore, there is no interference of the electric wire when the case sub portion of the battery pack is accommodated into the accommodation part, the accommodating operation can be smoothly performed, and fear of breaking of the electric wire can be removed.

BEST MODE FOR CARRYING OUT THE INVENTION

Figure 1:
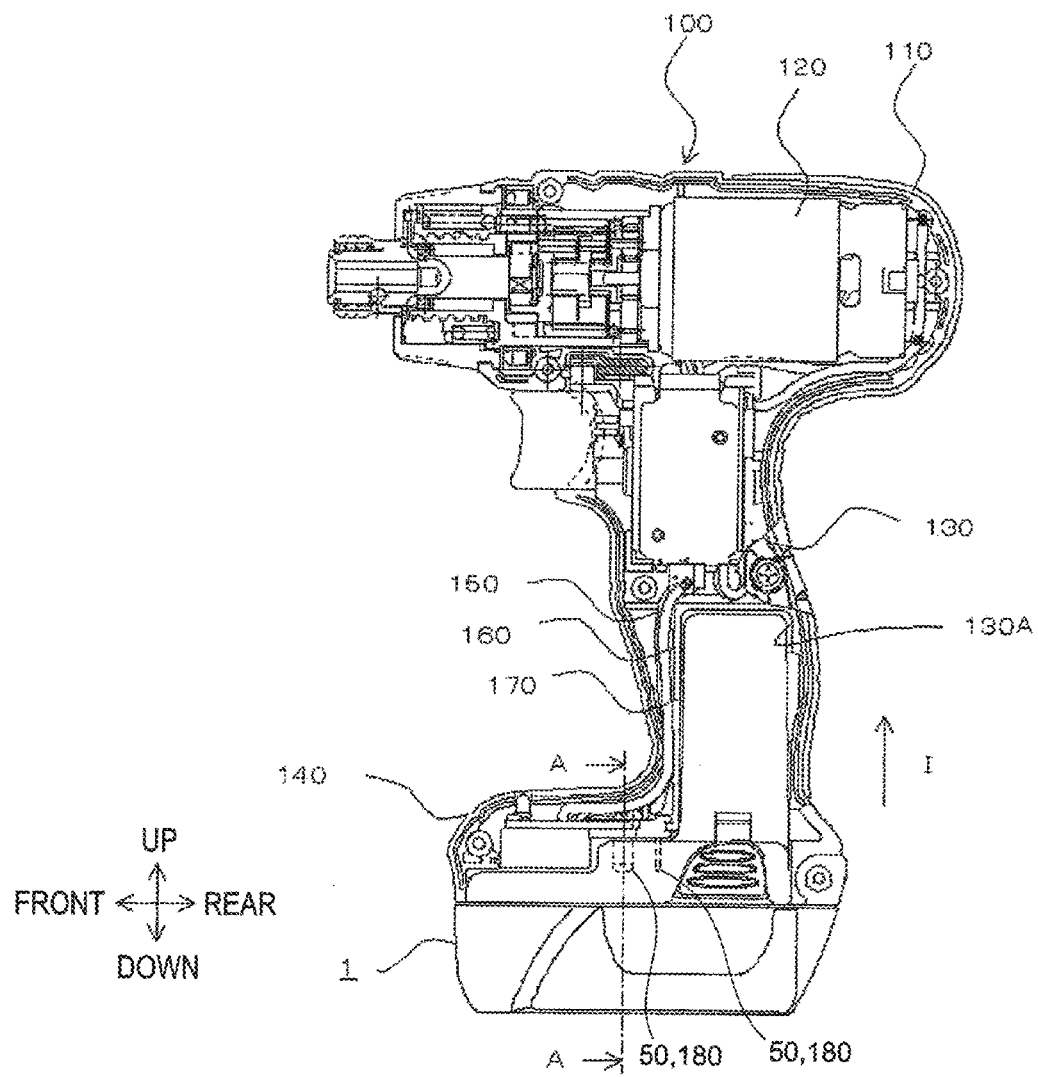
FIG. 1 is a side sectional view showing the inner constitution of a driver drill according to an embodiment of the present invention.

A driver drill according to an embodiment of the present invention will be described with reference to FIGS. 1 to 5. In FIG. 1, arrows indicating up-, down-, front- and rear-directions and an arrow I indicating an insertion direction of a battery pack 1 are shown. As shown in FIG. 1, a driver drill 100 is T-shaped in a side view. A main body part 110 of the driver drill 100 has horizontally-elongated shape, and a motor 120 functioning as a drive source is laterally accommodated in the main body part 110. A handle portion 130 for gripping downwardly extends from a central position of the main body part 110 at a lower side thereof. Further, at the lower end of the handle portion 130, a rectangular-shaped base 140 is formed, and the battery pack 1 is attached to the driver drill 100 from the downside of the base 140.

Inside the handle portion 130, there is formed an accommodation space 130A (accommodation part) for accommodating a case sub portion 22 of the battery pack 1 which will be described later. An electric wire passage 160 for drawing out an electric wire 150 connected to the motor 120 to the lower end of the handle portion 130 is formed along the accommodation space 130A through a partition wall 170 (intrusion regulating member). The electric wire 150 passes through the electric wire passage 160 and extends to the lower end of the handle portion 130. On the lower surface of the base 140, a male-type tool-side electrode terminal 180 to which electrode terminals 50A and 50B of the battery pack 1 are connected is arranged in a facedown posture, and the tool-side electrode terminal 180 and the motor 120 are electrically connected to each other through the electric wire 150. When the case sub portion 22 of the battery pack 1 is fully inserted into the accommodation space 130A of the handle portion 130, the both terminals 50 and 180 are connected to each other.

Figure 2:
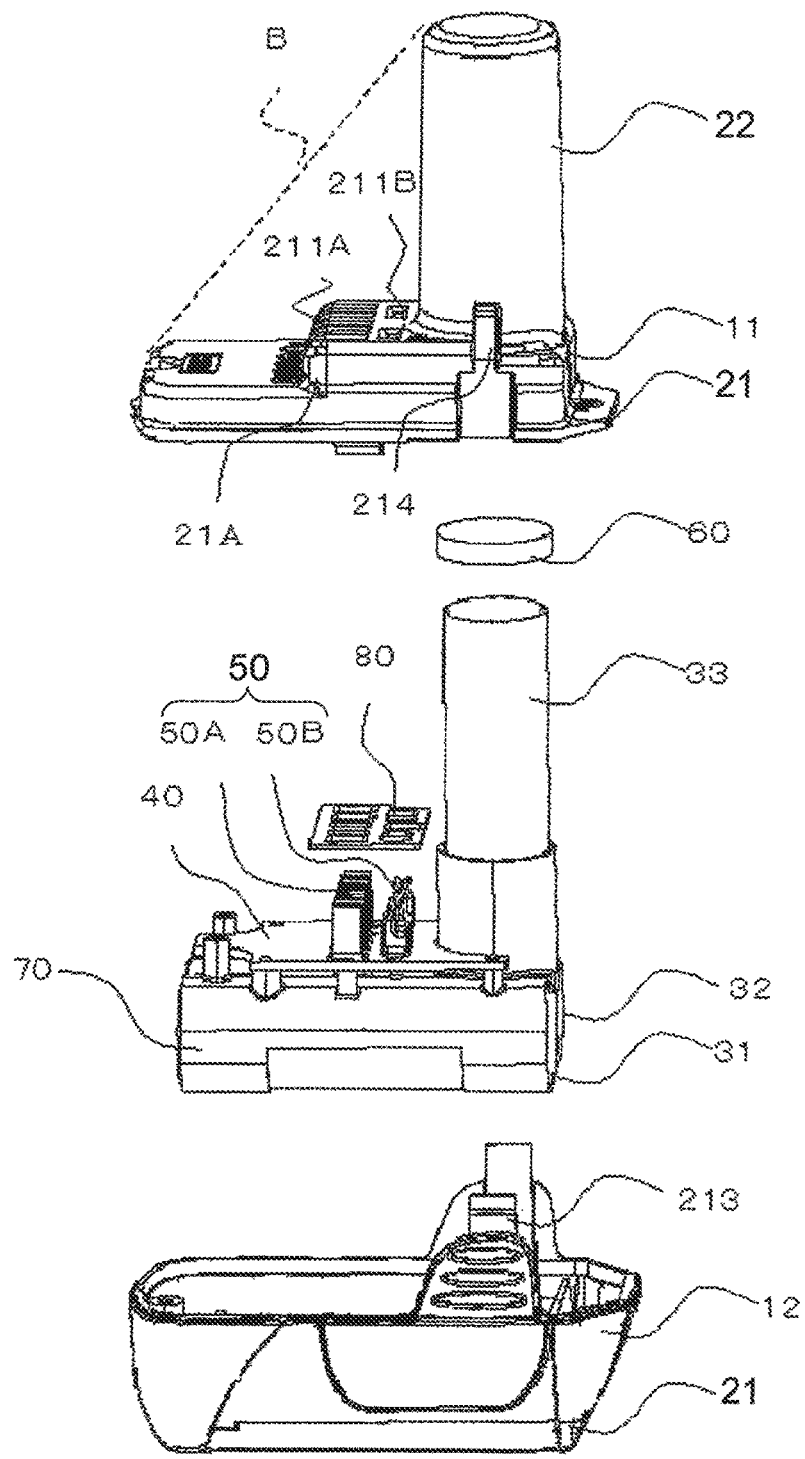
FIG. 2 is an exploded perspective view showing the inner constitution of a battery pack.
Figure 3:
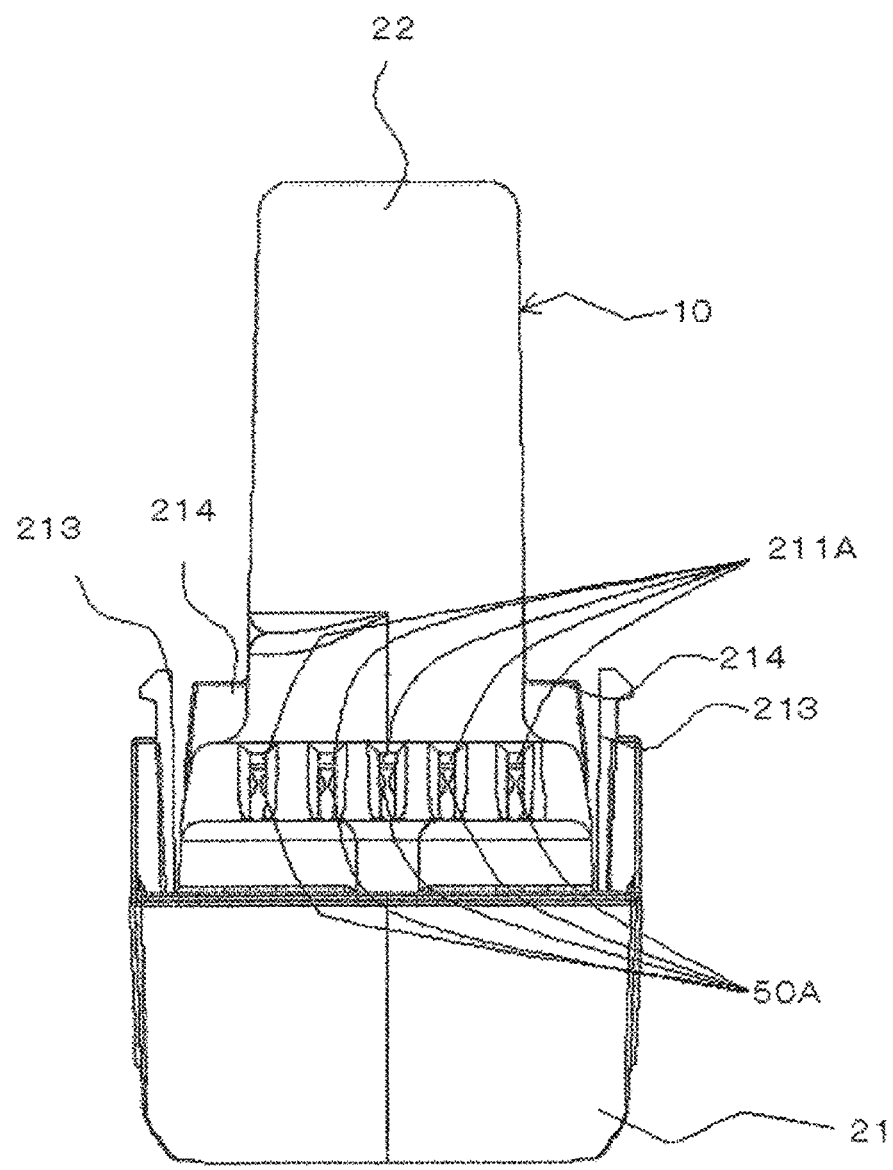
FIG. 3 is a plan view showing the front shape of the battery pack.
Figure 4:
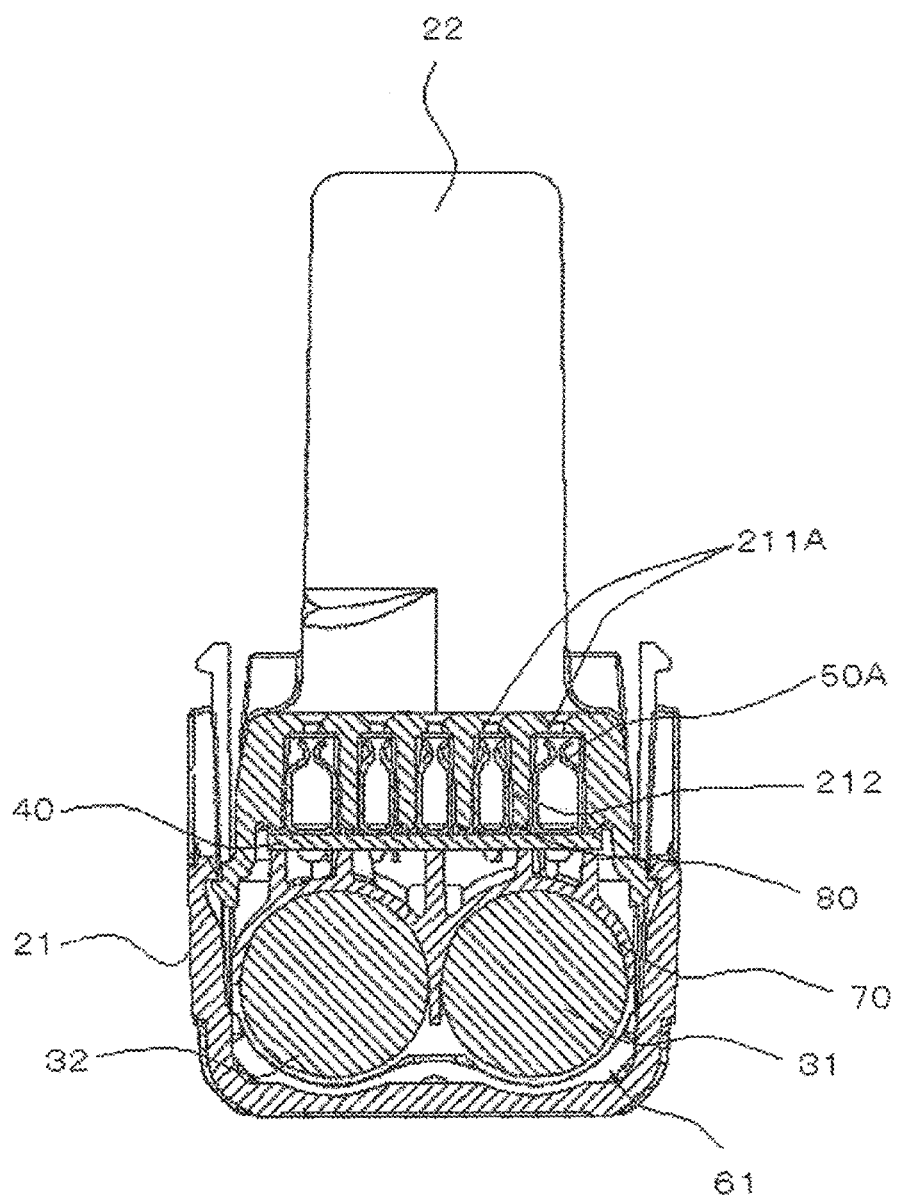
FIG. 4 is a sectional view taken along a line A-A in FIG. 1.

As shown in FIGS. 2 to 4, a case 10 of the battery pack 1 is composed of upper and lower case half parts 11 and 12, and formed by assembling the case half parts 11 and 12. The case 10 includes a horizontally-elongated case main portion 21 and a case sub portion 22 upwardly protruding from the case main portion 21 (in a direction orthogonal to the case main portion 21), and is L-shaped in a side view.

The case 10 accommodates three battery cells 31, 32 and 33, a circuit board 40 on which a protective circuit having a protective function for the battery cells 31, 32 and 33 is mounted, and the plural electrode terminals 50A and 50B to be connected to the tool-side electrode terminal 180 of the driver drill 100. The three battery cells 31, 32 and 33 are arranged in the L-shape in which the battery cells 31 and 32 are laterally accommodated in the case main portion 21 of the case 10 and in which the battery cell 33 is longitudinally accommodated in the case sub portion 22. On the downside of the laterally-plated battery cells 31 and 32 and on the upside of the longitudinally-placed battery cell 33, elastically-deformable cushion members 60 and 61 are provided, respectively.

On the upside of the laterally-placed battery cells 31 and 32, the circuit board 40 is arranged so that a board surface is opposed to circumferential surfaces of the battery cells 31 and 32. The circuit board 40 is screwed to a support member 70 that is attached to the laterally-placed battery cells 31 and 32, thereby to be integrated with the battery cells 31 and 32. The circuit board 40 is electrically connected to the three battery cells 31, 32 and 33 through not-shown electric wires.

On the circuit board 40, the female-type electrode terminals 50A and 5013 are mounted so as to receive the tool-side electrode terminal 180 from the upper direction. In the embodiment, the number of the mounted electrode terminals 50A and 50B is seven. The five electrode terminals 50A (first electrode terminal group) are aligned along the alignment direction of the laterally-placed battery cells 31 and 32. The other two electrode terminals 50B (second electrode terminal group) are arranged between the longitudinally-placed battery cell 33 and the five electrode terminals 50A. The electrode terminals 50A are each arranged in the right-and-left direction, and the electrode terminals 50B are each arranged in a direction orthogonal to the right-and-left direction. The seven electrode terminals 50A and 50B are densely arranged on the circuit board 40, and are located to be close to the longitudinally-placed battery cell 33. Accordingly, the electrode terminals 50A and 50B are arranged on the case main portion 21 so as to be closer to the case sub portion 22 as compared with an imaginary line B connecting ends of the case main portion 21 and the case sub portion 22.

The electrode terminals 50A and 50B are corresponds to functions of supplying power, outputting the battery temperature, outputting the battery classification, and outputting errors, respectively. Among the electrode terminals 50A and 50B, two electrode terminals 50A and 50B most distant from each other are functioning as the power supply electrode terminals. The electrode terminals are connected to the tool-side electrode terminal 180 of the driver drill 100 to supply the electric power to the driver drill 100. When each of the electrode terminals 50A and 50B is connected to a charger, a signal is output to the charger from each of the electrode terminals 50A and 50B.

A step portion 21A is formed on the upper surface of the case main portion 21, and a proximal side of the case main portion 21 is formed higher than a distal side of the case main portion 21 with the step portion 21A as a boundary. In the step portion 21A, five slits 211A are formed along the arrangement direction of the laterally-placed battery cells 31 and 32, and two slits 211B are formed between the five slits 211A and the case sub portion 22. In the slits 211A and 211B, the slit 211A is an L-shape opening which is opened forward and upward, and the slit 211B is an opening which is opened only forward. The slits 211A and 211B, when the case half parts 11 and 12 are assembled, are arranged correspondingly to the positions of the electrode terminals 50A and 50B. When the tool-side electrode terminal 180 is connected to the electrode terminal 50A and 50B, the tool-side electrode terminal 180 can enter into the case 10 through the slits 211A and 211B.

As shown in FIG. 4, on the inner side of the case main portion 21, partition walls 212 for isolating the adjacent electrode terminals 50A/50B are formed. The partition walls 212 are provided between the respective slits 211A/211B, and extended from the inner surface of the case main portion 21 toward the circuit board 40. Although not shown, a partition wall for isolating the electrode terminals 50A and the electrode terminals 505 is also formed.

Between the partition wall 212 and the circuit board 40, a sheet-shaped sealing member 80 formed of an elastic body, such as rubber or silicon, is provided. The sealing member 80 is formed thicker than the clearance distance between the partition wall 212 and the circuit board 40, and has an opening in a position corresponding to each electrode terminal 50A, 50B. When the electrode terminals 50A and 50B are inserted into the respective openings, the sealing member 80 is sandwiched between the circuit board 40 and the partition wall 212, and the elastic force is exhibited so that each space between the partition walls 212 is sealed and so that the space surrounded by the partition walls 212 and the inside space of the battery pack 1 are isolated from one another.

Figure 5:
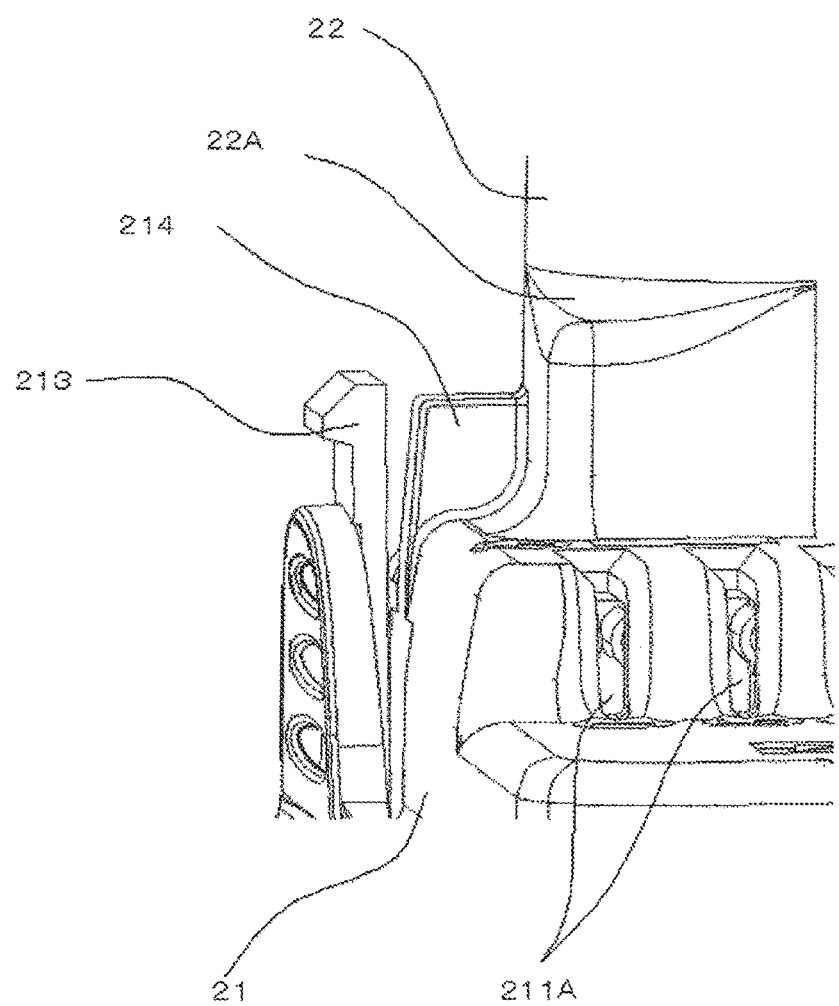
FIG. 5 is a partially perspective view showing the structure around a lock piece of the battery pack.

As shown in FIG. 5, on the proximal end side of the case sub portion 22, there is provided an insertion regulating convex part 22A which is swelled in the protruding direction of the case sub portion 22 and the orthogonal direction to the protruding direction. And, in the accommodation space 130A of the driver drill 100, an insertion regulating part (not shown) corresponding to the insertion regulating convex part. 22A is formed. The position of the insertion regulating convex part 22A can be determined according to the battery type of the battery pack 1. For example, for the battery pack 1 having low nominal voltage, the insertion regulating convex part 22A is positioned on the proximal end side of the case sub portion 22. On the other hand, for a battery pack 1 having high nominal voltage, the insertion regulating convex part 22A is positioned on the distal end side of the case sub portion 22. On the driver drill 100 to which the battery pack 1 is attached, an insertion regulating part is formed to be engaged with the insertion regulating convex part 22A of the battery pack 1 hiving a highest nominal voltage that is applicable to the driver drill 100.

On left and right end back sides of the case main portion 21, a pair of lock pieces 213 which can be locked to a lock reception part formed in the driver drill 100 when the case sub portion 22 is accommodated in the accommodation space 130A of the driver drill 100 are formed in bilaterally symmetric positions. The lock piece 213 is deformable and projects upward slightly beyond the height of the proximal end of the case sub portion 22. Around a boundary area between the case main portion 21 and the case sub portion 22, deformation regulating members 214 are formed in positions corresponding to the lock pieces 213 and project toward the respective lock pieces 213. By the deformation regulating members 214, the deformation amount of the lock piece 213 toward the battery pack 1 is limited to a given amount.

In the battery pack 1 according to the embodiment, the electrode terminals 50A and 50B are provided on the case main portion 21 to be closer to the case sub portion 22 as compared with the imaginary line B connecting the ends of the case main portion 21 and the case sub portion 22. Hereby, even if the battery pack 1 is placed in a sideways falling-down state and receives the shock from the outside, it is possible to protect the electrode terminals 50A and 50B from being directly shocked, so that the breakage and damage of the electrode terminals 50A and 50B can be effectively prevented. Further, since the cushion members 60 and 61 are provided, even if the strong shock is applied to the battery pack 1, the shock force onto the battery cells 31, 32 and 33 can be alleviated. Further, since the plural electrode terminals 50A and 50B are aligned along two lines that are parallel each other as two electrode terminal groups, the lateral width of the case main portion 21 can be reduced as compared with the case where all electrode terminals are aligned along one line. Further, by arranging the electrode terminal 50A and the electrode terminal 50B orthogonally, the size of the case main portion 21 can be further reduced.

Further, since the space between the partition walls 212 and the inside space of the battery pack 1 are isolated by the sealing member 80 provided in the battery pack 1, powder dusts and water which have intruded into the partition walls 2 do not enter into the battery pack 1, so that water proofing property and dust proofing property can be secured.

When the battery pack 1 is attached to the drill driver 100, the case sub portion 22 is inserted into the accommodation space 130A of the handle portion 130. At this time, since the electric wire 150 is positioned inside the electric wire path 160 formed through the partition wall 170, the electric wire 150 does not obstruct the insertion of the case sub portion 22 into the accommodation space 130 so that the entry operation can be smoothly performed, and there is no fear of breaking of wire due to interference of the electric wire 150 with the case sub portion 22.

For example, if a battery pack 1 having the nominal voltage over the applicable voltage of the driver drill 100 is attempted to be attached to the driver drill 100, the insertion regulating convex part 22A of the battery pack 1 abuts on the insertion regulating part on the driver drill 100 side, whereby the battery pack 1 is obstructed from being fully attached. Therefore, it is possible to prevent such erroneous insertion that the unsuitable battery pack 1 is attached to the driver drill 100.

In an attaching operation of the battery pack 1 to the drill driver 100, a frictional force is generated between the tool-side electrode terminal 180 and the electrode terminals 50A and 50B from when they abut each other, and the connection depth therebetween increases against the frictional force as the case sub portion 22 is further inserted into the accommodation space 130.

Although the pressing force applied onto the circuit board 40 increases as the connection depth increases, the pressing force is absorbed by the cushion member 61 provided between the laterally-placed battery cells 31 and 32 and the case 10. Further, even if the pressing force which cannot be completely absorbed by the cushion member 61 is produced, since the circuit board 40 is integrated with the battery cells 31 and 32 by the support member 70, the circuit board 40 is not deformed by the pressing force, so that the damage of the circuit board 40 can be avoided.

Further, since the circuit board 40 is accommodated in the case 10 in the posture orthogonal to the connection direction of the both terminals 50 and 180, it is possible to prevent the release force from being applied onto the mounting portion of the electrode terminals 50A and 50B when connecting the tool-side electrode terminal 180 to the electrode terminals 50A and 50B, thereby stabilizing the mounting state of the electrode terminals 50A and 50B.

Further, since each of the electrode terminals 50A and 50B are isolated by the partition walls 212, it is possible to prevent the adjacent electrode terminals 50A, 50B from coming into contact with each other by deformation of the electrode terminal 50A, 50B during connecting the both terminals 50 and 180, or prevent the adjacent electrode terminals 50A, 50B from coming into contact with each other by vibration.

When inserting the case sub portion 22 into the accommodation space 130A, the side surface of the case main portion 21 abuts on the inner surface of the base 140, and the lock pieces 213 of the battery pack 1 are locked to the lock reception parts provided on the driver drill 100, whereby the battery pack 1 is attached to the driver drill 100 in a fall-out preventing state.

By pushing the lock pieces 213 to cause deformation toward the battery pack 1, the locking state of the lock pieces 213 to the lock reception parts is released, and the case sub portion 22 is pulled out from the accommodation space 130A while keeping the lock-released state, thereby detaching the battery pack 1 from the driver drill 100. Since the deformation amount of the lock piece 213 is regulated by the deformation regulating member 214, the lock piece 213 is prevented from being excessively deformed so that the damage/breakage of the lock piece 213 is prevented.

The present invention is not limited to the embodiment explained in the above description and drawings, but, for example, the following embodiments are also included in the technical scope of the present invention, and in addition to the following embodiments, various modifications may be made without departing from the spirit of the present invention.

(1) Though the case sub portion 22 is arranged on the back end side of the case main portion 21 in the above embodiment the case sub portion 22 may be arranged, for example, on the center side of the case main portion 21.

(2) Though the driver drill 100 is shown as an example of the power tool in the above embodiment, the present invention can be applied also to other kinds of power tools as long as they use the motor 120 as a drive source.

(3) Though the partition walls 212 are provided between the respective electrode terminals 50A and 50B in the above embodiment, the partition walls may be provided, for example, only around the electrode terminals 50A and 50B that function as the power supply electrode terminal.

This application claims priority from Japanese Patent Application No. 2007-280279 filed on Oct. 29, 2007, the entire contents of which are incorporated herein by reference.

INDUSTRIAL APPLICABILITY

According to an aspect of the present invention, there is provided a battery pack in which an electrode terminal is surely protected and a power tool provided with the battery pack.

The invention claimed is:
1. A battery pack comprising:
a case including an upper case part and a lower case part provided lower to the upper case part and formed by assembling the upper case part and the lower case part;
a battery cell accommodated inside the case; and
a plurality of electrode terminals electrically connected to the battery cell,
wherein the upper case part includes;
an opening that allows a tool-side electrode terminal of a power tool to enter inside the case and connect to one of the plurality of electrode terminals when the battery pack is attached to the power tool,
a step portion to which the opening is formed,
a low portion, and
a high portion having a larger height than the low portion, the step portion serving as a boundary between the high portion and the low portion, and wherein at least a part of a sealing member, which has an opening in a position corresponding to at least one of the plurality of electrode terminals, is provided to the high portion, and a periphery of the at least one of the plurality of electrode terminals is sealed by the upper case part and the sealing member.

2. The battery pack according to claim 1, further comprising:
a circuit board arranged at an upper side of the battery cell and on which a protective circuit for the battery cell is mounted,
wherein the sealing member is provided at an upper side of the circuit board.

3. A power tool to which a battery pack is detachably attached, the power tool comprising;
a main body accommodating a motor serving as a drive source therein;
a tool-side electrode terminal electrically connected to the motor;
a handle portion extending from the main body; and
a base formed at a lower end of the handle portion and to which the battery pack is configured to be mounted,
wherein the battery pack includes;
a case including an upper case part and a lower case part provided lower to the upper case part and formed by assembling the upper case part and the lower case part,
a battery cell accommodated inside the case, and
a plurality of electrode terminals electrically connected to the battery cell,
wherein the upper case part includes:
an opening which allows the tool-side electrode terminal to enter inside the case and connect to one of the plurality of electrode terminals when the battery pack is attached to the power tool,
a step portion to which the opening is formed,
a low portion, and
a high portion having a larger height than the low portion, the step portion serving as a boundary between the high portion and the low portion, and wherein at least a part of a sealing member, which has an opening in a position corresponding to at least one of the plurality of electrode terminals is provided to the high portion, and a periphery of the at least one of the plurality of electrode terminals is sealed by the upper case part and the sealing member.

4. A battery pack comprising:
a case including an upper case part and a lower case part provided lower to the upper case part and formed by assembling the upper case part and the lower case part;
a battery cell accommodated inside the case;
a plurality of electrode terminals electrically connected to the battery cell; and
a sealing member having an opening in a position corresponding to at least one of the electrode terminals,
wherein the upper case part includes a first upper surface, a second upper surface higher than the first upper surface, and a connecting surface that connects the first upper surface and the second upper surface,
wherein an opening, which is configured to allow a tool-side electrode terminal of a power tool to enter inside the case and connect to one of the plurality of electrode terminals when the battery pack is attached to the power tool, is provided to the connecting surface, and
wherein at least a part of the sealing member is provided between the second upper surface of the upper case part and the lower case part, and a periphery of the at least one of the electrode terminals is sealed by the upper case part and the sealing member.

5. The battery pack according to claim 4, further comprising:
a circuit board arranged at an upper side of the battery cell and on which a protective circuit for the battery cell is mounted,
wherein at least the part of the sealing member is provided between the second upper surface of the upper case part and the circuit board.

* * * * *